US010217277B2

(12) United States Patent
Robert et al.

(10) Patent No.: US 10,217,277 B2
(45) Date of Patent: Feb. 26, 2019

(54) KEYPOINT-BASED POINT-PAIR-FEATURE FOR SCALABLE AUTOMATIC GLOBAL REGISTRATION OF LARGE RGB-D SCANS

(71) Applicant: Autodesk, Inc., San Rafael, CA (US)

(72) Inventors: Luc Franck Robert, Valbonne (FR); Nicolas Gros, Le Rouret (FR); Yann Noutary, Tourrettes-sur-Loup (FR); Lucas Malleus, Valbonne (FR); Frederic Precioso, Plascassier (FR); Diane Lingrand, Valbonne (FR)

(73) Assignee: AUTODESK, INC., San Rafael, CA (US)

( * ) Notice: Subject to any disclaimer, the term of this patent is extended or adjusted under 35 U.S.C. 154(b) by 132 days.

(21) Appl. No.: 15/368,351

(22) Filed: Dec. 2, 2016

(65) Prior Publication Data

US 2017/0161945 A1 Jun. 8, 2017

Related U.S. Application Data

(60) Provisional application No. 62/263,476, filed on Dec. 4, 2015.

(51) Int. Cl.
*G06T 17/00* (2006.01)
*G06T 17/10* (2006.01)
(Continued)

(52) U.S. Cl.
CPC .............. *G06T 17/005* (2013.01); *G01S 7/00* (2013.01); *G06K 9/00* (2013.01); *G06T 7/00* (2013.01); *G06T 17/10* (2013.01)

(58) Field of Classification Search
CPC ........... G06T 3/00; G06T 3/0068; G06T 7/30; G06T 15/00; G06T 15/10; G06T 17/00;
(Continued)

(56) References Cited

U.S. PATENT DOCUMENTS 8,442,307 B1 * 5/2013 Anati ........................ G06T 7/73 382/154
2008/0181487 A1 * 7/2008 Hsu ...................... G06K 9/3241 382/154

(Continued)

OTHER PUBLICATIONS

Bosché, Frédéric. "Plane-based registration of construction laser scans with 3D/4D building models." Advanced Engineering Informatics 26.1 (2012): 90-102.*

(Continued)

*Primary Examiner* — Sae Won Yoon
(74) *Attorney, Agent, or Firm* — Gates & Cooper LLP

(57) ABSTRACT

A method, system, and apparatus provide the ability to globally register point cloud scans. A first and a second three-dimensional (3D) point cloud are acquired. The point clouds have a subset of points in common and there is no prior knowledge on an alignment between the point clouds. Particular points that are likely to be identified in the other point cloud are detected. Information about a normal of each of the detected particular points is retrieved. A descriptor (that only describes 3D information) is built on each of the detected particular points. Matching pairs of descriptors are determined. Rigid transformation hypotheses are estimated (based on the matching pairs) and represent a transformation. The hypotheses are accumulated into a fitted space, selected based on density, and validated based on a scoring. One of the hypotheses is then selected as a registration.

18 Claims, 8 Drawing Sheets

(51) Int. Cl.
*G01S 7/00* (2006.01)
*G06K 9/00* (2006.01)
*G06T 7/00* (2017.01)

(58) Field of Classification Search
CPC ..... G06T 17/05; G06T 19/00; G06T 2210/56; G01S 17/00; G01S 17/89
USPC .......................................................... 345/419
See application file for complete search history.

(56) References Cited

U.S. PATENT DOCUMENTS

2014/0003705 A1* 1/2014 Taguchi .................. G06T 7/344 382/154
2015/0112645 A1* 4/2015 Zeisl ....................... G06T 7/521 703/1

OTHER PUBLICATIONS

Diez, Y., et al., "A Qualitative Review on 3D Coarse Registration Methods", ACM Computing Surveys, Feb. 2015, pp. 45:1-45:36, vol. 47, No. 3.
Besl, P., et al., "A Method for Registration of 3-D Shapes", IEEE Transactions on Pattern Analysis and Machine Intelligence, Feb. 1992, pp. 239-256, vol. 14, No. 2.
Rusinkiewicz, S., et al., "Efficient Varients of the ICP Algorithm", Proceedings of the Third Int'l Conference on 3D Digital Imaging and Modeling, 2001, pp. 145-152.
Makadia, A., et al., "Fully Automatic Registration of 3D Point Clouds", Proceedings of the 2006 IEEE Computer Society Conference on Computer Vision and Pattern Recognition, CVPR '06, 2006, pp. 1297-1304.
Nuchter, A., et al., "Cached k-d tree search for ICP algorithms", 3-D Digital Imaging and Modeling, 3DIM '07, Aug. 2007, pp. 419-426.
Donoser, M., et al., "3D segmentation by Maximally Stable Volumes (MSVs)", Proceedings of the 18th International Conference on Pattern Recognition, IEEE Computer Society, 2006, pp. 63-66.
Sun, J., et al., "A Concise and Provably Informative Multi-Scale Signature Based on Heat Diffusion", Eurographics Symposium on Geometry Processing, 2009, pp. 1383-1392, vol. 28, No. 5.
Zaharescu, A., et al., "Surface Feature Detection and Description with Applications to Mesh Matching", Computer Vision and Pattern Recognition, 2009, CVPR 2009, IEEE Conference, pp. 373-380.
Zhong, Y., "Instrinsic Shape Signatures: A Shape Descriptor for 3D Object Recognition", Computer Vision Workshops (ICCV Workshops), 2009, IEEE 12th International Conference, pp. 689-696.
Mian, A., et al., "On the Repeatability and Quality of Keypoints for Local Feature-based 3D Object Retrieval from Cluttered Scenes", International Journal of Computer Vision 89, 2010, pp. 348-361.
Sipiran, I., et al., "Harris 3D: a robust extension of the Harris operator for interest point detection on 3D meshes", Vis. Comput., 2011, pp. 963-976, vol. 27.
Feldmar, J., et al., "Rigid, Affine and Locally Affine Registration of Free-Form Surfaces", International Journal of Computer Vision, 1996, pp. 99-119, vol. 18, No. 2.
Chua, C., et al., "Point Signatures: A New Representation for 3D Object Recognition", International Journal of Computer Vision, 1997, pp. 63-85, vol. 25, No. 1.
Tombari, F., et al., "Unique Signatures of Histograms for Local Surface Description", Proceedings of the 11th European Conference on Computer Vision, 2010, ECCV '10, pp. 356-369, Springer-Verlag, Berlin, Heidelberg.
Zhang, Z., et al., "Improved Spin Images for 3D Surface Matching Using Signed Angles", Image Processing (ICIP), 2012, 19th IEEE International Conference, pp. 537-540.
Darom, T., et al., "Scale-Invarient Features for 3-D Mesh Models", IEEE Transactions on Image Processing, May 2012, pp. 2758-2769, vol. 21, No. 5.
Pottmann, H., et al., "Integral Invariants for Robust Geometry Processing", Computer Aided Geometric Design, 2009, pp. 37-60, vol. 26, No. 1.
Wyngaerd, J.V., "Automatic Crude Patch Registration: Toward Automatic 3D Model Building", Computer Vision and Image Understanding, 2002, pp. 8-26, vol. 87.
Kortgen, M., et al., "3D Shape Matching with 3D Shape Contexts", The 7th Central European Seminar on Computer Graphics, 2003, pp. 1-12, 425.
Dey, T.K., et al., "Shape Segmentation and Matching with Flow Discretization", F-Dehne, J.-R. Sack, M. Smid (Eds.): WADS, 2003, pp. 25-36, vol. 2748.
Cornea, N.D., et al., "Curve-Skeleton Properties, Applications and Algorithms", IEEE Transactions on Visualization and Computer Graphics, 2007, pp. 530-548, vol. 13, No. 3.
Tagliasacchi, A., et al., "Curve Skeleton Extraction from Incomplete Point Cloud", ACM SIGGRAPH 2009 Papers, SIGGRAPH '09, pp. 71:1-71:9, New York, NY.
Rusu, R.B., et al., "Fast Point Feature Histograms (FPFH) for 3D Registration", IEEE International Conference on Robotics and Automation, 2009, pp. 3212-3217.
Dey, T.K., et al., "Persistant Heat Signature for Pose-oblivious Matching of Incomplete Models", Eurographics Symposium on Geometry Processing, 2010, pp. 1-11, vol. 29, No. 5.
Suo, Y., et al., "RoPS: A Local Feature Descriptor for 3D Rigid Objects based on Rotational Projection Statistics", International Conference on Communications, Signal Processing, and their Applications (ICCSPA), 2013, pp. 1-6.
Tarel, J-P., et al., "Pose Estimation of Free-Form 3D Objects without Point Matching using Algebraic Surface Models", Proceedings of IEEE Workshop Model Based 3D Image Analysis, 1998, pp. 13-21, Mumbai, India.
Chen, C-S., et al., "RANSAC-based DARCES: A New Approach to Fast Automatic Registration of Partially Overlapping Range Images", IEEE Transactions on Pattern Analysis and Machine Intelligence, 1999, pp. 1229-1234, vol. 21, No. 11.
Salvi, J., et al., "A review of recent range image registration methods with accuracy evaluation", Image and Vision Computing, 2007, pp. 578-596, vol. 25.
Diez, Y., et al., "Hierarchical Normal Space Sampling to speed up point cloud coarse matching", Pattern Recognition Letters, 2012, pp. 2127-2133, vol. 33.
Gelfand, N., et al., "Robust Global Registration", Eurographics Symposium on Geometry Processing, 2005, pp. 1-10.
Aiger, D., et al., "4-Points Congruent Sets for Robust Pairwise Surface Registration" ACM SIGGRAPH 2008 Papers, SIG475 GRAPH '08, pp. 85:1-85:10, New York, NY.
Santamaria, J., et al., "A comparative study of state-of-the-art evolutionary image registration methods for 3D modeling", Computer Vision and Image Understanding, 2011, pp. 1340-1354, vol. 115.
Zeisl, B., et al., "Automatic Registration of RGB-D Scans via Salient Directions", 2013 IEEE International Conference on Computer Vision, Dec. 1-8, 2013, pp. 2808-2815.
Mellado, M., et al., "Super 4PCS Fast Global Pointcloud Registration via Smart Indexing", Eurographics, 2014, pp. 205-215, vol. 33, No. 5.
Mohamed, M., et al., "Generalized 4-Points Congruent Sets for 3D Registration", Proceedings of the 2014 Second International Conference on 3D Vision, 2014, pp. 83-90, vol. 1., Washington, DC.
Drost, B., et al., "Model Globally, Match Locally: Efficient and Robust 3D Object Recognition", IEEE Conference on Computer Vision and Pattern Recognition, 2010, pp. 998-1005.
Birdal, T., et al., "Point Pair Features Based Object Detection and Pose Estimation Revisited", IEEE on 3D Vision, 2015, pp. 527-535.
Pauly, M., et al., "Efficient Simplification of Point-Sampled Surfaces", IEEE on Visualization, 2002, pp. 163-170.
Badino, H., et al., "Fast and Accurate Computation of Surface Normals from Range Images", International Conference on Robotics and Automation (ICRA), May 9-13, 2011, pp. 1-8.

(56) References Cited

OTHER PUBLICATIONS

PCT International Preliminary Report on Patentability dated Jun. 14, 2018 for PCT Application No. PCT/US2016/064816.

* cited by examiner

KEYPOINT-BASED POINT-PAIR-FEATURE FOR SCALABLE AUTOMATIC GLOBAL REGISTRATION OF LARGE RGB-D SCANS

CROSS-REFERENCE TO RELATED APPLICATIONS

This application is related to the following co-pending and commonly-assigned patent application, which application is incorporated by reference herein:

U.S. Patent Application Ser. No. 62/263,476, filed on Dec. 4, 2015 entitled "KPPF: KEYPOINT-BASED POINT-PAIR-FEATURE FOR SCALABLE AUTOMATIC GLOBAL REGISTRATION OF LARGE RGB-D SCANS", with inventor(s) LUC FRANCK ROBERT, NICOLAS GROS, YANN NOUTARY, LUCAS MALLEUS, FREDERIC PRECIOSO, and DIANE LINGRAND, et. al.

BACKGROUND OF THE INVENTION

1. Field of the Invention

The present invention relates generally to point cloud scans, and in particular, to a method, apparatus, and article of manufacture for automatically and efficiently conducting a global registration of large point cloud scans.

2. Description of the Related Art (Note: This application references a number of different publications as indicated throughout the specification by reference numbers enclosed in brackets, e.g., [x]. A list of these different publications ordered according to these reference numbers can be found below in the section entitled "References." Each of these publications is incorporated by reference herein.)

For a few years now, the world of three-dimensional (3D) data faces a true revolution with many new devices easily available for both capturing data and visualizing data whether it be pure virtual 3D data for virtual reality applications or combined 3D and visual data for augmented reality. This new context with everyday new applications based on 3D information, more 3D data of many different types, and new sensors, presents many new challenges. Among these challenges, the first processing step (preceding almost always any other processing from 3D data) is the registration of data acquired by a sensor from different locations. Indeed, whatever the kind of sensors considered (Laser scanner, KINECT, etc.), no existing technology can acquire the whole 3D information of a scene all at once.

Thus, a 3D acquisition usually results in a set of 3D points (a 3D point cloud), with or without associated RGB information depending on the sensor, covering partially the spatial area of the full scene. One problem in the data acquisition process is the registration of multiple scans. Single scans, from different sensor positions, are acquired within a local coordinate frame defined by the instrument. For visualization and further data processing of the point cloud, the single scans must be transformed into a common coordinate frame. This process is termed as "registration." Given two or more 3D point clouds that have a subset of points in common, the goal of 3D registration is to compute the rigid transformation that aligns these point clouds, providing an estimation of the relative pose between them. This registration of partially overlapping 3D point clouds, usually considered pair by pair, taken from different views is thus an essential task in 3D computer vision and the basis of many algorithms in 3D vision applications.

There are two well identified challenges in this task of 3D registration:

- Global registration: refers to the registration of a pair of 3D point clouds without initial guesses on the pose of one point cloud to the other, the pose is thus arbitrary; and
- Local registration: refers to the registration of a pair of 3D point clouds from a valid initial estimate of the pose between the two clouds.

Many algorithms for registration have addressed these challenges in the last decades. It is commonly accepted in the community to classify the algorithms into two (2) distinctive classes [1] based on the challenge they address:

- Coarse registration: consists of roughly aligning two scans without any clue about the initial alignment; and
- Fine registration: from a given coarse alignment, a fine registration refines the result, generally by minimizing error iteratively.

The global registration usually requires both coarse and fine registration steps, while for the local registration challenge, it is often sufficient to consider a fine registration process only.

A popular type of approach involves iterative processing referred to as Iterative Closest Point (ICP) [2] and variants [3; 4; 5]. However, in practice, the original ICP methods tend to converge poorly when subjected to severe noise and large pose displacements without a good initial guess on scans alignment. Thus, ICP, or its variants, are often used for a fine registration stage in order to improve previous coarse registration but are not suitable as direct solutions for coarse registration.

Some other approaches try to get rid of any requirement for a good initial estimate by extracting invariant local features and finding correspondences. However, the main limitation of such methods is a lack of robustness to large baselines (large sensor viewpoint changes) and little overlap.

With the availability of several new consumer-grade 3D sensors, many solutions have been proposed to solve this problem and work pretty well for reasonably sized point clouds (few thousands of points) even with little overlap, noise and a pretty large baseline.

One of the main advantage of LiDAR (light imaging, detection and ranging) scans over ordinary point clouds is that they are acquired in a global 3D coordinate system. This way, Euclidean distance can be used to describe patterns in the scene. It considerably reduces the complexity of the problem by locking the scale. Furthermore, the LiDAR scans are almost noiseless.

There are many algorithms trying to solve the registration problem using either only geometrical information, or only visual information (e.g. RGB values attached to the 3D points), and eventually some use both. The main drawback is that most of the current solutions are not able to efficiently solve the global registration problem when all of the following constraints are present: large scale data, large baseline, little overlap, and no initial guess of the relative alignment.

To better understand these problems, a description of the related art may be useful.

A survey of the most significant contributions in the domain can be found in [1]. As described in this survey, all of the approaches of coarse registration can be compared considering the following main steps:

(1) Salient information detectors: The survey [1] presents Normal Space Sampling [3], Maximally Stable Volumes [6], Heat Kernel-based Features [7], MeshDoG [8], Intrinsic Shape Signatures [9], Key-Point Quality [10], and Harris3D [11];

(2) Salient information descriptors: The survey [1] presents Principal Curvature [12], Point Signature [13], Spin Image (Intrinsic Shape Signatures [9] and SHOT [14]), Improved Spin Image [15], Scale-Invariant Spin Image [16], Principal Component Analysis [17; 11; 16], Line-based algorithm [18], 3D Shape Contexts [19], Dynamical Systems [20], Integral Invariants [17], Curve Skeleton [21; 22], Point Feature Histograms [23], MeshHOG [8], Intrinsic Shape Signatures [9], Heat Kernel Signature [7; 24], and Rotational Projection Statistics [25];

(3) Searching strategies: The survey [1] presents Algebraic Surface Model [26], RANSAC-based Methods [27; 28; 29], Robust Global Registration [30], 4-points Congruent Sets [31], and Evolutionary Methods [32]; and (4) Refinement: This step is mainly based on ICP [2] and its improvements [3; 4; 5]

The survey [1] not only reports the current state-of-the-art on coarse registration but it proposes a pipeline to classify these existing methods with respect to the aforementioned main steps. The survey [1] also defines a standard formal notation to provide a global point of view of the state-of-the-art.

One classic approach to describe the scans around salient detectors is based on normal distribution. This idea has already been taken into account in several approaches. For instance, an approach based on normals distribution has been proposed by Makadia & al. [4]. Normals are accumulated in an orientation histogram. Peaks are identified and create constellations, that are then aligned to directly give the rotation between two scans. Translation can be deduced right afterwards. The limitations identified in this approach are that overlap has to be important, and that normals from the overlap area must be discriminative regarding the distribution of normals through the whole point clouds while being consistent with this distribution.

One solution to address these limitations, when RGB information is available, is to combine 3D and RGB detection, description and matching. For instance, Zeisl et. al. [33] addressed these limitations by combining 3D information with standard vision matching using 2D SIFT. The idea in their paper is to project the scan in perspective views orientated towards "salient directions," that are identified as peaks on the normals distribution as in the previous work. However, this algorithm is challenged by point clouds with few planar areas, or surfaces presenting an important tilt when viewed from the scan location.

In cases such as scanner acquisitions, there may be lot of self-occlusions, leaving large parts of the scene hidden from the scanner. Since the occlusions are likely to be different from one viewpoint to another, one may utilize a smaller size for the neighborhood. However, using a smaller size for the neighborhood might not be suitable since the information held by such a neighborhood could vary a lot.

Another approach is set forth in Aiger et. al. [31]. Aiger [31] proposed a 4-Points Congruent Sets (4PCS) algorithm that does not use local description. Instead, [31] considers groups of 4 quasi-coplanar points in the point cloud. A shape descriptor is used that is based on the distances between these points and the intersection of the line segments they define. The selected points must be spread enough to guarantee algorithm stability, and close enough to ensure that the points are in the overlap area between the two viewpoints. The geometric configuration of four coplanar points is discriminant enough to create strong matches between the two point clouds. Aiger's work on the 4PCS algorithm inspired several other approaches still introducing the 4-Points Congruent Sets principle: the Super4PCS [34] is based on a smart indexing data organization reducing the algorithm complexity from quadratic to linear in the number or data points; Mohamad et. al. [35] generalizes 4PCS by allowing the two pairs to fall on two different planes that have an arbitrary distance between them, then by increasing this distance, the search space of matching hypotheses exponentially leads to a maximum run-time improvement of 83:10%.

However the Super4PCS is more complex to implement and the run-time improvement is almost always dividing 4PCS run-time by two. Similarly the Generalized 4PCS reach more than 80% of run-time improvement but this is only evaluated on datasets with less than 100K points.

Thus another idea to reduce the complexity of 4PCS could be to not anymore rely on 4-Points Congruent Sets rather relying on two points.

Indeed, the idea of a four component descriptor based on angles and distance between two points, has been first proposed by Drost et al. [36].

Drost [36] applied this descriptor, called Point Pair Feature (PPF), for efficient and robust 3D object recognition.

Another prior art approach is that of T. Birdal and S. Ilic [37] which proposes a full processing chain based on their PPF descriptor to address the problem of large scene scan registration.

In view of the above, what is needed is a global registration method that can be efficiently used with large scale data, large baseline, little overlap, and no/little pose information/ relative assignment information.

SUMMARY OF THE INVENTION

Embodiments of the invention provide a descriptor-based approach to global registration of point cloud data. Particular points/regions within the scan that are likely to be identified in another scan are identified. Information from those points (position and normal) are retrieved and a descriptor is built on it. One correspondence is sufficient to estimate a rigid transformation between the two scan locations. Accordingly, embodiments of the invention solve the 3D global registration problem in environments with large scale data (several millions of points), large baseline, little overlap and no prior knowledge on the alignment for about 30 scans.

BRIEF DESCRIPTION OF THE DRAWINGS

Referring now to the drawings in which like reference numbers represent corresponding parts throughout:

FIG. 7A illustrates a top down view of the scanner positions on a dataset while

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

One of the most important challenges in the field of 3D data processing is to be able to reconstruct a complete 3D scene with high accuracy from several point cloud scans/captures. Usually this process is achieved through two main phases: a coarse, or rough, alignment step then a fine alignment. For decades, methods have addressed each of these two phases or both, by adding constraints to the original problem such as, for instance, using artificial markers and/or user input for coarse alignment, or such as considering small scale scans with a large overlap for fine alignment.

Embodiments of the invention provide an automatic scalable global registration method (i.e. without arbitrary pose of the sensor) under the following constraints: markerless, very large scale data (several millions of points), little overlap between scans, for more than two or three dozens of scans, without a priori knowledge on the six (6) degrees of freedom.

For professional quality and even more for large scale environments, LiDAR technology may be used. LiDAR acquisitions provide point clouds with little noise and the knowledge of the spatial range.

One or more embodiments of the invention only address the coarse alignment considering the fine alignment step tackled by dedicated existing approaches. The methodology described herein is evaluated on dataset of thirty-two (32) large scale scans of an indoor building. The data presents some pairs of scans with very little overlap, architectural challenges (a patio and a rotunda open through several levels of the buildings, etc.), several millions of points per scan. Accordingly, the following aspects may be evaluated: the accuracy of the method, the scalability to the initial amount of points and the robustness to occlusions, little scan overlap, and architectural challenges.

Hardware Environment

Figure 1:
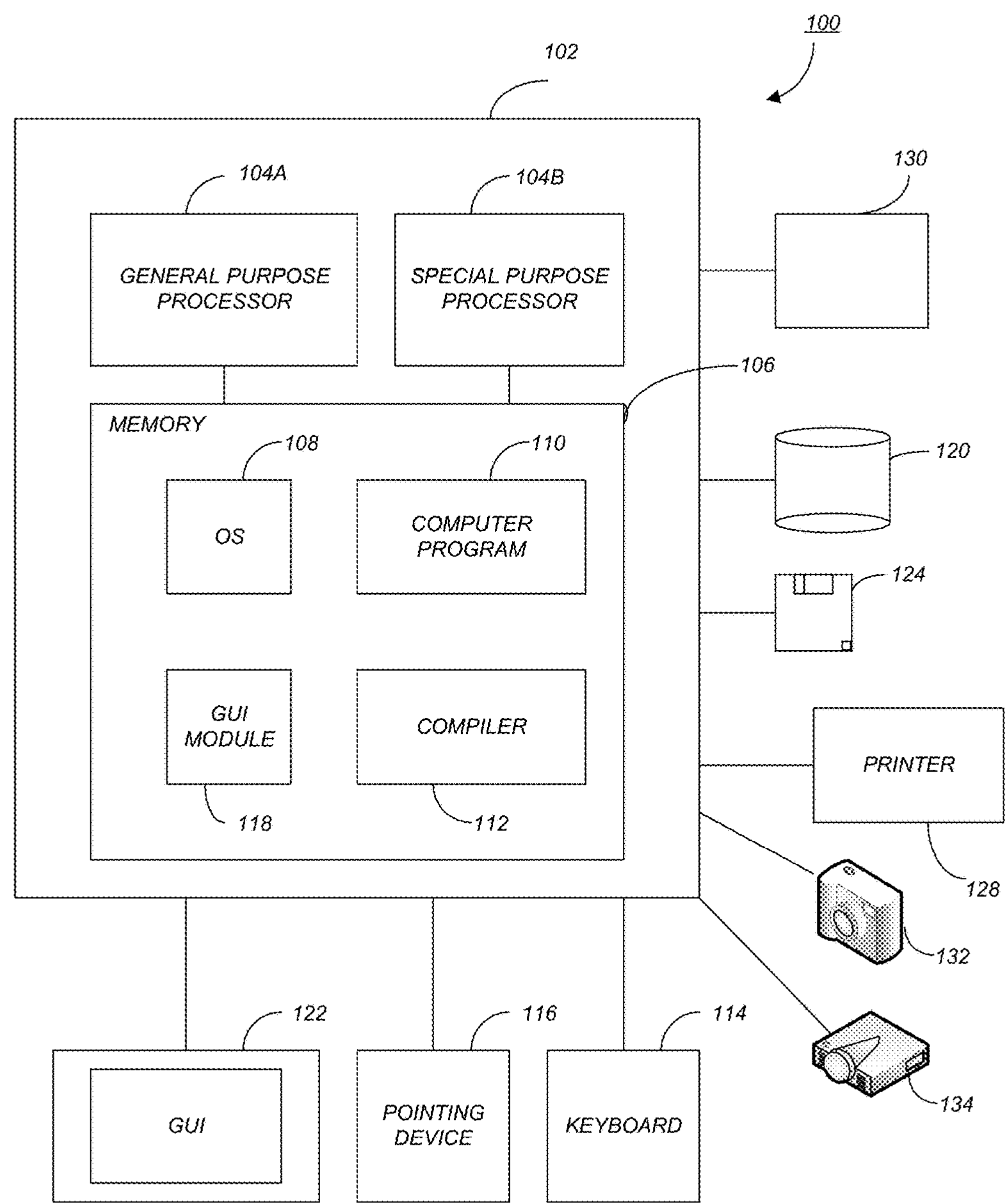
FIG. 1 is an exemplary hardware and software environment used to implement one or more embodiments of the invention.

FIG. 1 is an exemplary hardware and software environment 100 used to implement one or more embodiments of the invention. The hardware and software environment includes a computer 102 and may include peripherals. Computer 102 may be a user/client computer, server computer, or may be a database computer. The computer 102 comprises a general purpose hardware processor 104A and/or a special purpose hardware processor 104B (hereinafter alternatively collectively referred to as processor 104) and a memory 106, such as random access memory (RAM). The computer 102 may be coupled to, and/or integrated with, other devices, including input/output (I/O) devices such as a keyboard 114, a cursor control device 116 (e.g., a mouse, a pointing device, pen and tablet, touch screen, multi-touch device, etc.) and a printer 128.

In one or more embodiments, computer 102 may be coupled to, or may comprise, a camera or photo capturing device 132 (e.g., a digital camera, a cellular phone, a personal digital assistant, etc.). In yet another embodiment, the computer 102 may comprise a multi-touch device, mobile phone, gaming system, internet enabled television, television set top box, or other internet enabled device executing on various platforms and operating systems.

In one or more embodiments, computer 102 is communicatively coupled to, or may comprise, a laser scanner 134. Such a laser scanner 134 may consist of a field measurement device capable of producing a 3D representation of present conditions through the collection of individually measured points. The set of all points collected and registered with another after the scanning process is referred to as a point cloud. Such a point cloud may be stored in data storage devices 120/124, within the scanner 134, in memory 106, and/or in any other device capable of storing such information. The laser scanner 134 may utilize a variety of scanning methods including aerial, static, and mobile. Such laser scanning may scan millions of point in seconds without climbing on equipment and/or conducting contact measurements.

In one embodiment, the computer 102 operates by the general purpose processor 104A performing instructions defined by the computer program 110 under control of an operating system 108. The computer program 110 and/or the operating system 108 may be stored in the memory 106 and may interface with the user and/or other devices to accept input and commands and, based on such input and commands and the instructions defined by the computer program 110 and operating system 108, to provide output and results.

Output/results may be presented on the display 122 or provided to another device for presentation or further processing or action. In one embodiment, the display 122 comprises a liquid crystal display (LCD) having a plurality of separately addressable liquid crystals. Alternatively, the display 122 may comprise a light emitting diode (LED) display having clusters of red, green and blue diodes driven together to form full-color pixels. Each liquid crystal or pixel of the display 122 changes to an opaque or translucent state to form a part of the image on the display in response to the data or information generated by the processor 104 from the application of the instructions of the computer program 110 and/or operating system 108 to the input and commands. The image may be provided through a graphical user interface (GUI) module 118. Although the GUI module 118 is depicted as a separate module, the instructions performing the GUI functions can be resident or distributed in the operating system 108, the computer program 110, or implemented with special purpose memory and processors.

In one or more embodiments, the display 122 is integrated with/into the computer 102 and comprises a multi-touch device having a touch sensing surface (e.g., track pod or touch screen) with the ability to recognize the presence of two or more points of contact with the surface. Examples of multi-touch devices include mobile devices (e.g., IPHONE, NEXUS S, DROID devices, etc.), tablet computers (e.g., IPAD, HP TOUCHPAD), portable/handheld game/music/video player/console devices (e.g., IPOD TOUCH, MP3 players, NINTENDO 3DS, PLAYSTATION PORTABLE, etc.), touch tables, and walls (e.g., where an image is projected through acrylic and/or glass, and the image is then backlit with LEDs). Such multi-touch devices may also be integrated with or contain image capture capabilities such as a lens/camera 132, etc.

Some or all of the operations performed by the computer 102 according to the computer program 110 instructions may be implemented in a special purpose processor 104B. In this embodiment, some or all of the computer program 110 instructions may be implemented via firmware instructions stored in a read only memory (ROM), a programmable read only memory (PROM) or flash memory within the special purpose processor 104B or in memory 106. The special purpose processor 104B may also be hardwired through circuit design to perform some or all of the operations to implement the present invention. Further, the special purpose processor 104B may be a hybrid processor, which includes dedicated circuitry for performing a subset of functions, and other circuits for performing more general functions such as responding to computer program 110 instructions. In one embodiment, the special purpose processor 104B is an application specific integrated circuit (ASIC).

The computer 102 may also implement a compiler 112 that allows an application or computer program 110 written in a programming language such as C, C++, Assembly, SQL, PYTHON, PROLOG, MATLAB, RUBY, RAILS, HASKELL, FORTRAN, or other language to be translated into processor 104 readable code. Alternatively, the compiler 112 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 110 accesses and manipulates data accepted from I/O devices and stored in the memory 106 of the computer 102 using the relationships and logic that were generated using the compiler 112.

The computer 102 also optionally comprises an external communication device such as a modem, satellite link, Ethernet card, or other device for accepting input from, and providing output to, other computers 102.

In one embodiment, instructions implementing the operating system 108, the computer program 110, and the compiler 112 are tangibly embodied in a non-transitory computer-readable medium, e.g., data storage device 120, which could include one or more fixed or removable data storage devices, such as a zip drive, floppy disc drive 124, hard drive, CD-ROM drive, tape drive, etc. Further, the operating system 108 and the computer program 110 are comprised of computer program 110 instructions which, when accessed, read and executed by the computer 102, cause the computer 102 to perform the steps necessary to implement and/or use the present invention or to load the program of instructions into a memory 106, thus creating a special purpose data structure causing the computer 102 to operate as a specially programmed computer executing the method steps described herein. Computer program 110 and/or operating instructions may also be tangibly embodied in memory 106, data storage device 120/124, and/or data communications devices 130, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 102.

Figure 2:
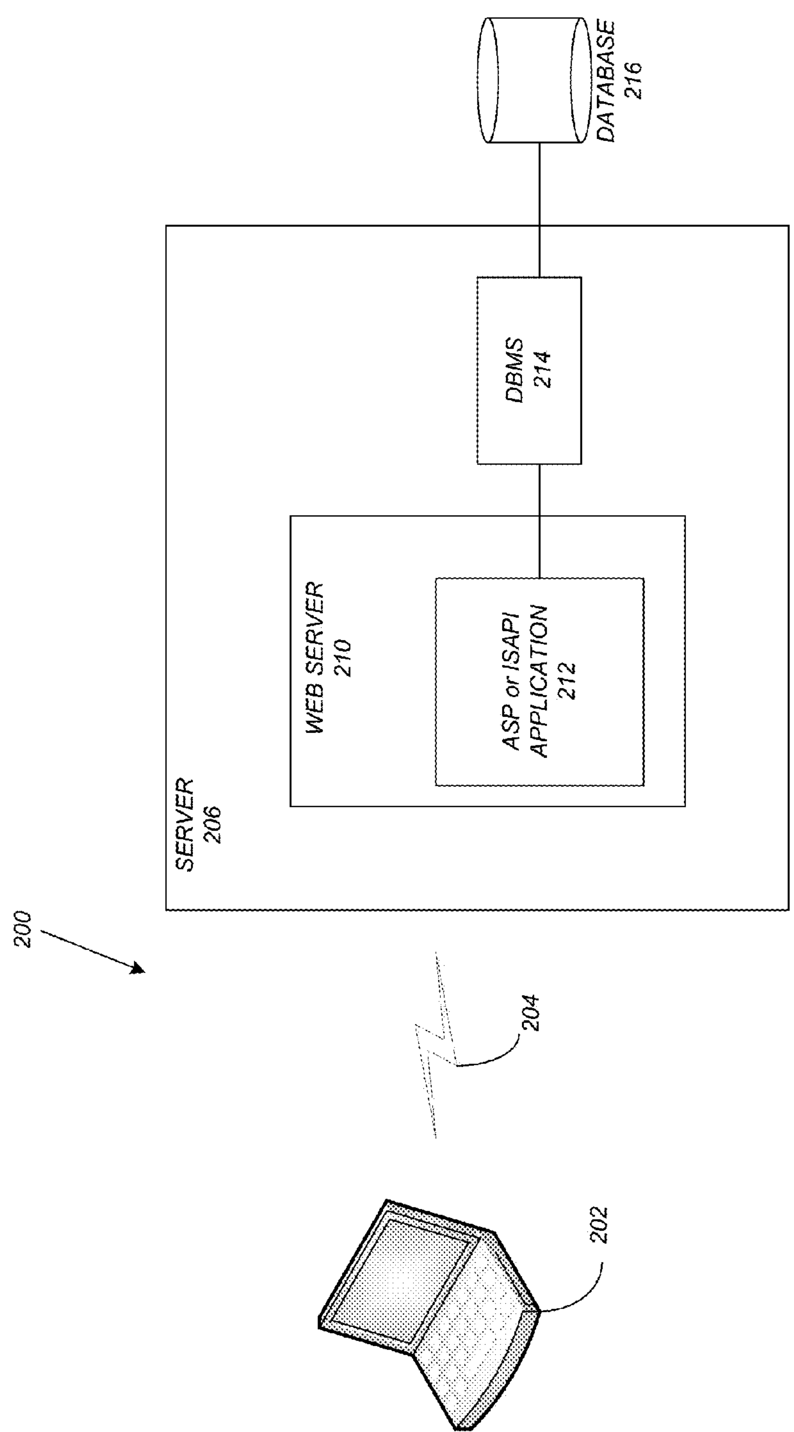
FIG. 2 schematically illustrates a typical distributed/ cloud-based computer system using a network to connect client computers to server computers in accordance with one or more embodiments of the invention.

FIG. 2 schematically illustrates a typical distributed/cloud-based computer system 200 using a network 204 to connect client computers 202 to server computers 206. A typical combination of resources may include a network 204 comprising the Internet, LANs (local area networks), WANs (wide area networks), SNA (systems network architecture) networks, or the like, clients 202 that are personal computers or workstations (as set forth in FIG. 1), and servers 206 that are personal computers, workstations, minicomputers, or mainframes (as set forth in FIG. 1). However, it may be noted that different networks such as a cellular network (e.g., GSM [global system for mobile communications] or otherwise), a satellite based network, or any other type of network may be used to connect clients 202 and servers 206 in accordance with embodiments of the invention.

A network 204 such as the Internet connects clients 202 to server computers 206. Network 204 may utilize ethernet, coaxial cable, wireless communications, radio frequency (RF), etc. to connect and provide the communication between clients 202 and servers 206. Further, in a cloud-based computing system, resources (e.g., storage, processors, applications, memory, infrastructure, etc.) in clients 202 and server computers 206 may be shared by clients 202, server computers 206, and users across one or more networks. Resources may be shared by multiple users and can be dynamically reallocated per demand. In this regard, cloud computing may be referred to as a model for enabling access to a shared pool of configurable computing resources.

Clients 202 may execute a client application or web browser and communicate with server computers 206 executing web servers 210. Such a web browser is typically a program such as MICROSOFT INTERNET EXPLORER, MOZILLA FIREFOX, OPERA, APPLE SAFARI, GOOGLE CHROME, etc. Further, the software executing on clients 202 may be downloaded from server computer 206 to client computers 202 and installed as a plug-in or ACTIVEX control of a web browser. Accordingly, clients 202 may utilize ACTIVEX components/component object model (COM) or distributed COM (DCOM) components to provide a user interface on a display of client 202. The web server 210 is typically a program such as MICROSOFT'S INTERNET INFORMATION SERVER.

Web server 210 may host an Active Server Page (ASP) or Internet Server Application Programming Interface (ISAPI) application 212, which may be executing scripts. The scripts invoke objects that execute business logic (referred to as business objects). The business objects then manipulate data in database 216 through a database management system (DBMS) 214. Alternatively, database 216 may be part of, or connected directly to, client 202 instead of communicating/obtaining the information from database 216 across network 204. When a developer encapsulates the business functionality into objects, the system may be referred to as a component object model (COM) system. Accordingly, the scripts executing on web server 210 (and/or application 212) invoke COM objects that implement the business logic. Further, server 206 may utilize MICROSOFT'S TRANSACTION SERVER (MTS) to access required data stored in database 216 via an interface such as ADO (Active Data Objects), OLE DB (Object Linking and Embedding DataBase), or ODBC (Open DataBase Connectivity).

Generally, these components 200-216 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 202 and 206 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 202 and 206. Embodiments of the invention may be implemented as a software application on a client 202 or server computer 206. Further, as described above, the client 202 or server computer 206 may comprise a thin client device or a portable device that has a multi-touch-based display.

Global Registration Overview

Figure 3:
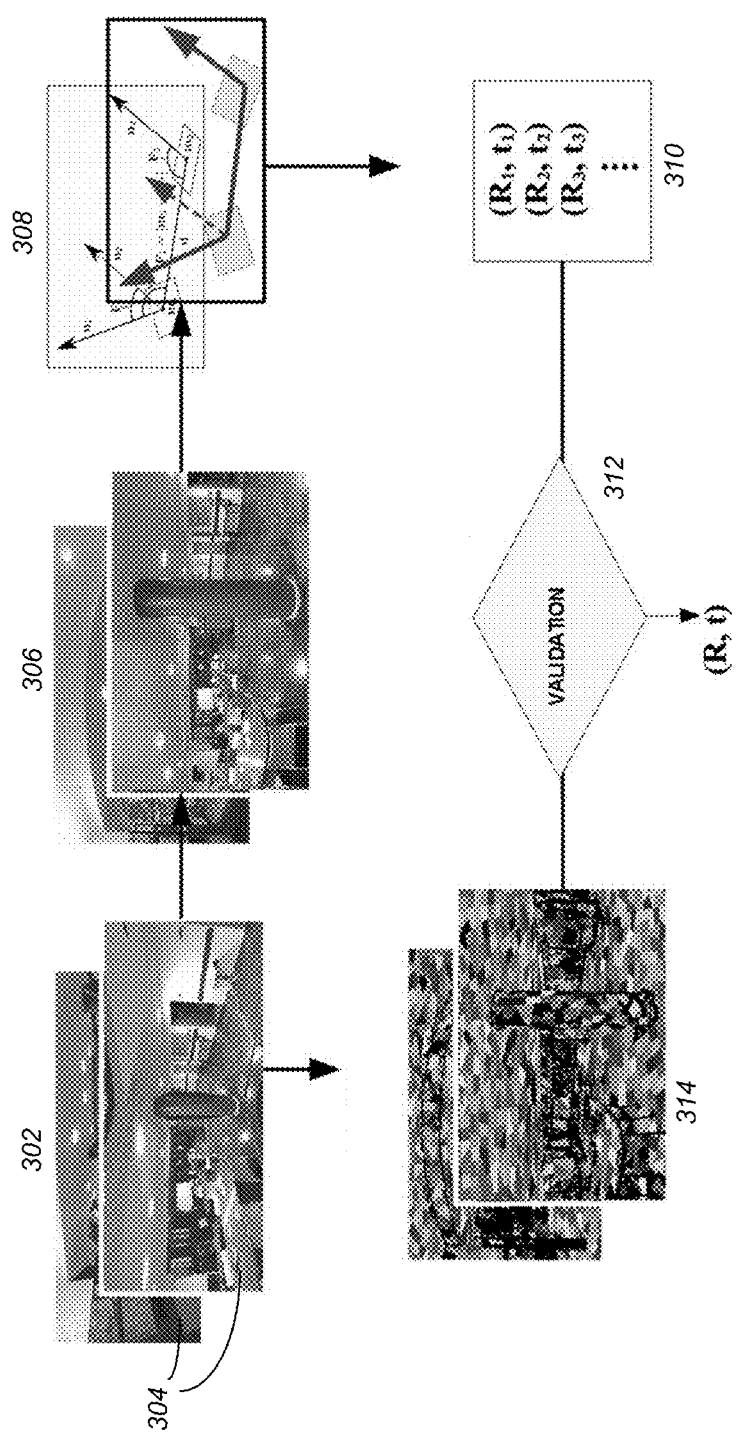
FIG. 3 illustrates an overview of a global registration process in accordance with one or more embodiments of the invention.

FIG. 3 illustrates an overview of a global registration process in accordance with one or more embodiments of the invention.

At step 302, a set of scans 304 (e.g., a first 3D point cloud and a second 3D point cloud) are acquired/input (e.g., via laser scanner 134/LiDAR or received from across a network 204). Such scans 304 are scans with normal (and such normal information may be retrieved). The two point clouds have a subset of points in common and there is no prior knowledge on an alignment between the two point clouds.

At step 306, keypoints (also referred to as particular points) in the scans 304 are detected. Such keypoints are those points likely to be identified in the other point cloud's scan. The detecting may be performed by undertaking successive filters at different scales that are then subtracted. Further, the detecting may filter points in the first point cloud based on a threshold of response intensity, split a space of the first point cloud into fixed-size 3D buckets, and only a first n strongest points in each of the fixed-size 3D buckets may be considered.

To create correspondences between scans 304, a sufficiently discriminate description is needed. Instead of describing detected points locally, pairs of such points are made and descriptors are built on this basis. In this regard, at step 308, descriptors are calculated/built. Each descriptor describes only 3D information (e.g., about a normal of each point). During the information retrieval operation, a neighborhood around each of the detected points may be considered. An attempt may be made to fit a plane around each neighborhood using normalized least squares. If the attempt is successful, based on the plane, a normal is calculated for the corresponding detected particular point, and then refined. Points that don't have a calculated normal are then discarded.

To build a descriptor on each point, various distances/angles may be estimated. In this regard, a spatial distance between two points may be estimated. Thereafter, a first angle between a first normal of a point and a line defined between the first point and a second point is estimated. A second angle may be estimated between a second normal of the second point and the line defined between the first point and the second point. Lastly, a third angle may be estimated between the two estimated normals.

Step 308 further includes determining matching pairs of descriptors (i.e., one descriptor from each point cloud in a pair). To determine matching pairs, a 4D kd-tree may be built using all of the descriptors. For the first descriptor, a nearest neighbor search may be performed in the tree for candidate descriptors from the second point cloud. Those descriptors within a threshold distance value are kept and stored.

The descriptors are used to estimate rigid transformation hypotheses (i.e., at step 310). Each hypothesis represents a transformation between the first and second point cloud. Further, each hypothesis is based on the 3D information in the matching pair. Since there may be a lot of outliers, the transformations are accumulated into a fitted space and a search for zones with high density is conducted (e.g., similar to a classic Hough transform). Accordingly, one or more hypotheses are selected based on density. The most relevant transforms are then scored to define the correct alignment. In this regard, the selected hypotheses are validated based on a scoring at step 312. The scoring may be based on a translation as a first criterion and a rotation as a second criterion.

The validation process 312 may include multiple steps. First a hypothesis (that consists of a translation and a rotation) may be determined. A voxel in 3D voxel space corresponding to the translation is found. If the voxel is empty, the hypothesis is stored. If the voxel is not empty, if the rotation is within a threshold rotation to an existing hypothesis group in the voxel, the hypothesis is added to the existing group and stored in the voxel. However, if the rotation is outside of the threshold rotation, a new group is created and the hypothesis is added to the new group and stored in the voxel. Whenever a hypothesis is stored in the voxel, a score is added to neighboring voxels determined by a Gaussian based on a distance from the hypothesis to a center of the neighboring voxels.

To provide a simpler point cloud representation that is convenient for validation 312, embodiments of the invention may also perform scan/point cloud clustering in parallel (at step 314).

One of the validated hypotheses is then selected for use as the registration between the two point clouds. Thus, at step 310, a hypothesis is generated for the candidates and each candidate is scored.

Details regarding one or more of the steps 302-314 are set forth below.

Keypoints Detection 306

As described above, at step 306, keypoints in the scans 304 are detected. Numerous 3D detectors may be utilized. One or more embodiments of the invention may utilize a detector that is not too sensitive that it performs self-occlusions, yet has a decent repeatability—regardless of the descriptor. Moreover, detected points must have one stable normal to be described, which means features such as corners are not of interest.

Embodiments of the invention utilize RGB-D (red green blue-depth) scans 304: there is color data attached to every single point. Thus, it is desirable to have a detector that is not only geometric-based, but is also able to take color information into account. Tests were performed on the repeatability of common detectors on datasets. A SIFT (scale-invariant feature transform) is a method used to detect and describe local features in images. One or more embodiments of the invention may utilize a SIFT 3D detector. Further, embodiments may implement such a SIFT 3D detector based on the Point Cloud Library (PCL) (see www.point-clouds.org). To counter the effects of occlusions on the detection step 306, a maximum absolute scale may be set to a low value compared to the size of the point cloud. To ensure that keypoints are detected in every part of the scan 304, buckets may be used to filter the set of keypoints. These keypoints are detected on purpose with a low initial threshold on response intensity, so that a large number are detected through the whole scan. The space may then be split into fixed-size 3D buckets and only the first n strongest keypoints in each bucket are considered.

The size of the buckets is a function of the scale of the scene, whereas n is set to have a reasonable number of keypoints through the scans (too few leads to a lack of repeatability, too many drastically increases the execution time).

In view of the above, embodiments of the invention detect keypoints from the point clouds/meshes, to describe them exploiting only the (X,Y,Z) information (no RGB) and to create correspondences that are finally used to generate hypotheses of possible registrations (see further description below).

Descriptor

In one or more embodiments a descriptor is built purely based on 3D information. Further, such a descriptor does not make a strong use of the point neighborhood. However, the detector of salient points may be based on the point neighborhood, since occlusions do not have such an impact on it.

Exemplary Descriptor

An exemplary descriptor that may be used in embodiments of the invention is K-4PCS (keypoint-based 4-points congruent sets) and PPF (point pair feature). However, 4PCS has issues when dealing with large point clouds: complexity can make it intractable to use all input data points. By limiting computation to keypoints detected by a feature detector such as SIFT, the point clouds are down-sampled in a way that preservers correspondences if features are repeatable enough. This also avoids dealing with local descriptions. Nonetheless, finding sets of four coplanar keypoints that would be visible from both point clouds can be challenging due to the non-repeatable features detected. For this reason, embodiments of the invention reduce the number of points in a descriptor to two. To still be able to compute the rigid transformation, the normal may remain associated to both points.

Descriptor Construction

As described above, embodiments of the invention may not be concerned with the local description of the keypoints apart from the surface normal. Accordingly, only detection may be performed in this part. As described above, SIFT 3D undertakes successive filters at different scales, that are then subtracted. Maxima are identified as keypoints. To limit sensitivity to occlusions, the maximum scale may be voluntarily forced to be not too large—regarding the point cloud size.

Figure 4:
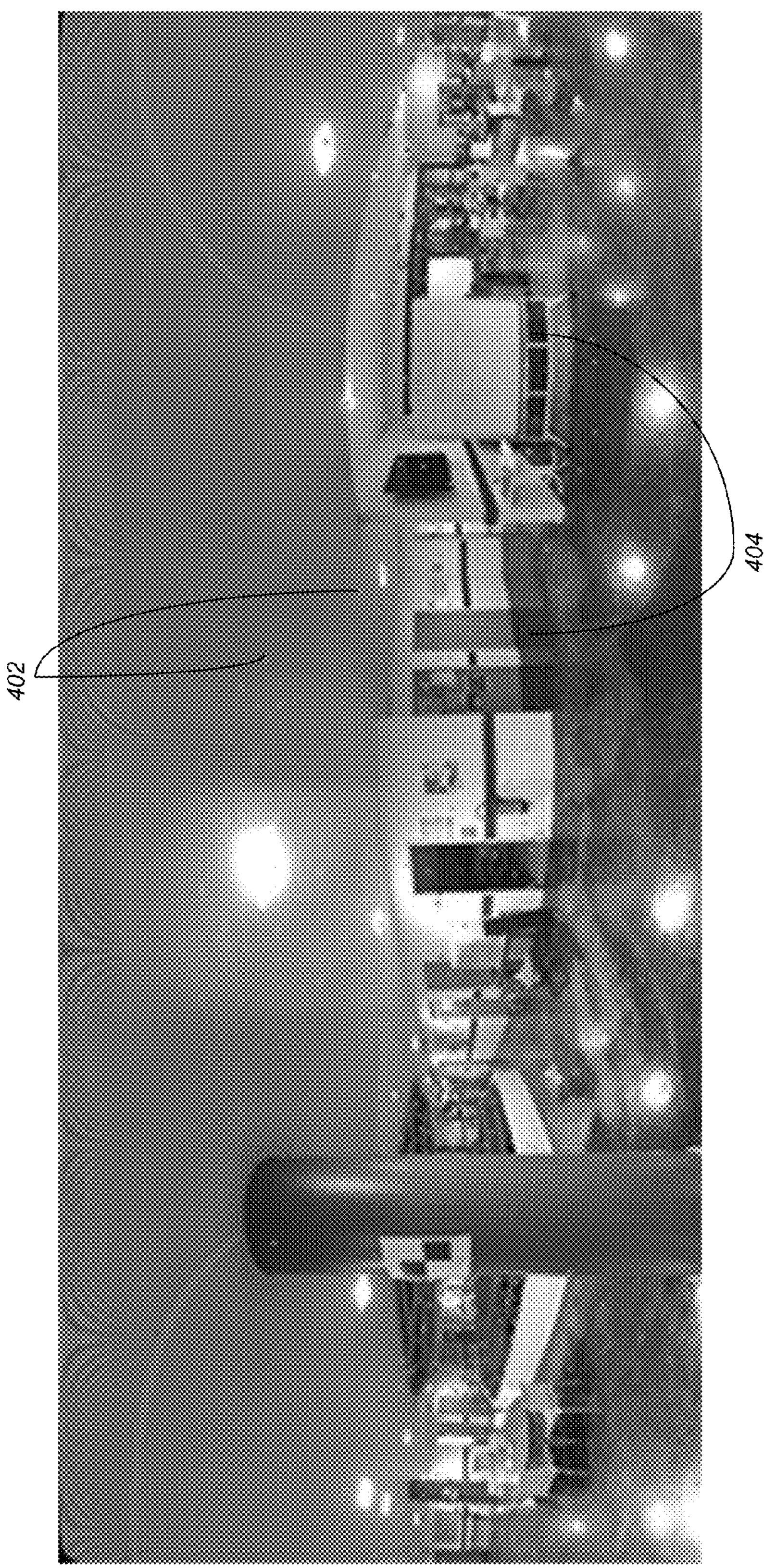
FIG. 4 illustrates a close-up on keypoints extracted in accordance with one or more embodiments of the invention.

At every keypoint, reliable normal information is needed. For this, a neighborhood around each keypoint is considered, and embodiments try to fit a plane to the corresponding data using normalized least squares (e.g., see [39] for examples). If the neighborhood is planar enough, a robust normal is calculated and refined to fit the local geometry. Keypoints that don't have such normals are discarded and ignored for building descriptors. FIG. 4 illustrates a close-up on keypoints extracted (see scan position 5 in FIG. 7) in accordance with one or more embodiments of the invention. Dots 402 (colored in green or a first shade) have stable normals whereas dots 404 (colored in red or a second shade) do not, and are thus discarded.

Descriptors Calculation

The descriptor consists of values derived from a pair of two keypoints and their normals. Here, embodiments of the invention consider all of the points that have been detected at the first step using 3D SIFT, and haven't been discarded during the normal estimation step. The four (4) following values are then estimated to build the descriptor:

- spatial distance between the two points (1 value)($\vec{d}$);
- angles between the normals and the line defined by the two points (2 values) ($\alpha_1$ and $\alpha_2$) (it is important to use a criterion to sort the two angles that would be shared through different viewpoints. If not sorted, every set of two points could have two valid descriptors and it would drastically enhance the computation. Embodiments of the invention choose to set the smallest as first); and
- angle between the normals themselves (1 value)($\alpha_t$).

Figure 5A:
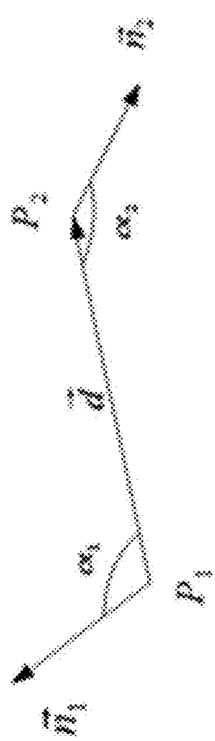
FIG. 5A illustrates the first three values of a descriptor (e.g., $\alpha_1$, $\vec{d}$, and $\alpha_2$)
Figure 5B:
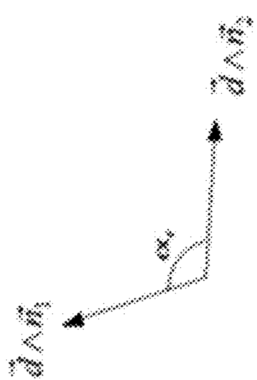
FIG. 5B illustrates the last value of a descriptor (e.g., $\alpha_t$) in accordance with one or more embodiments of the invention.

FIG. 5A illustrates the first three values of a descriptor (e.g., $\alpha_1$, $\vec{d}$, and $\alpha_2$), and FIG. 5B illustrates the last value of a descriptor (e.g., $\alpha_t$) in accordance with one or more embodiments of the invention.

Such a descriptor is fast to compute and very compact. This representation is very convenient and conveys sufficient information to compute a rigid transformation from a pair of descriptors. However, the same vector is being used to insert three angles and a distance, while all of the values will later be used regardless of their respective fundamental dimension. Thus, the idea of nearest neighbors highly depends on the weight given to every component. For this reason, the data is normalized such that an increment on any of the four values would change the distance between descriptors consistently.

In view of the above, one can conduct a performance test using either raw cosines of angles, raw angles, and/or angles with a scalar factor (to fit with the distance dimension).

Figure 6:
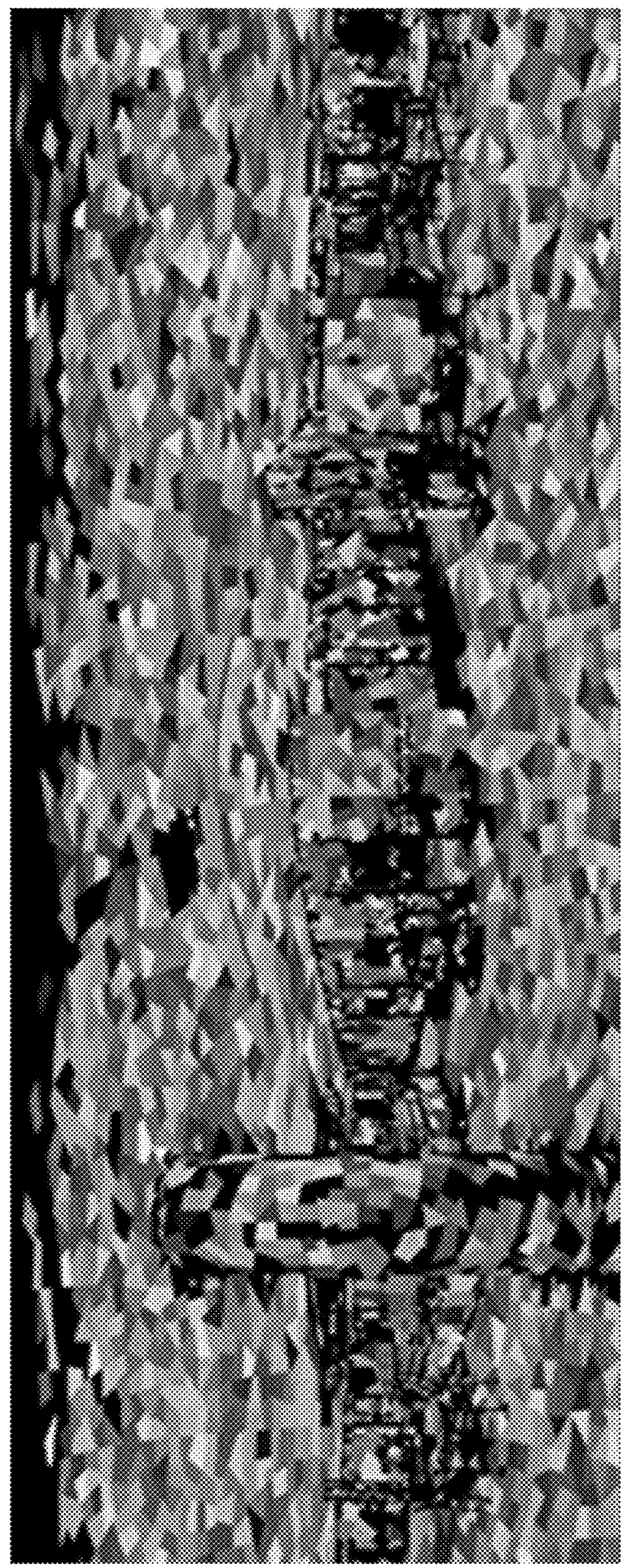
FIG. 6 illustrates a close up of extracted clusters in accordance with one or more embodiments of the invention.

Step 314 of FIG. 3 provides for point cloud/scan clustering. To validate a transformation, a way to score the transformation is needed (e.g., by checking to determine if the alignment provided is good/acceptable). In parallel with the other steps 306-310, the point cloud 304 may be split into clusters (e.g., using the method [38] referred to as hierarchical clustering). The output provides a simpler point cloud representation that is convenient for hypothesis validation (see the description below). FIG. 6 illustrates a close up of extracted clusters (e.g., illustrated in step 314 of FIG. 3) in accordance with one or more embodiments of the invention.

Descriptors Matching

As described above, embodiments of the invention provide an opportunity for any pair of descriptors to be a candidate for the registration. To efficiently find neighbors, a 4D kd-tree (k-dimensional tree) is built using all the descriptors for each point cloud. Then, for any descriptor from a given point cloud, embodiments efficiently look for the best candidates in the other point cloud by doing an approximate nearest neighbor search in the 4D kd-tree. Only descriptors whose distance to the original descriptor is small enough (e.g., within a defined threshold) are kept. Those kept are stored using the process described below.

Hypothesis Generation and Validation

To validate a hypothesis (i.e., step 312) that has been generated at step 310, a scoring based on alignment of patches may be used. This step 312 may rapidly become the most expensive in computation if too many candidates are scored.

One crucial step is to efficiently store the candidates, in order to highlight the ones that are worth being scored. Since there is a large number of false hypotheses, a search may be conducted for those hypotheses that occur frequently. However, the hypotheses are made of a rotation matrix ($R_n$) and a translation vector ($t_x$), making it hard to build a direct comparator. Accordingly, embodiments of the invention split these two components: the translation ($t_x$) is used as a first criterion, and the rotation ($R_n$) is then considered as a second criterion.

First of all, a regular 3D voxel space is generated with an appropriate range and scale regarding the point cloud. The three dimensions represent respectively the x, y and z components of the translations. A new hypothesis may be processed in various ways. The following presents pseudo code for an exemplary method for storing a candidate in the voxel space in accordance with one or more embodiments of the invention:

```
Data: Unclassified transform (rotation + translation) candidate
Result: Transform candidate stored in the voxel space
Construction of the voxel space;
while not empty candidates pool do
    read current transform;
    find the voxel corresponding to the translation;
    if voxel is empty then
        store the hypothesis as is;
    else
        if hypothesis' rotation close enough to one of the groups' then
            add the hypothesis to the group;
        else
            create a new group and add hypothesis;
        end
    end
end
```

To determine if a candidate belongs to a "group," the product of the candidate rotation matrix with the inverse of the representative of the group is computed. A check is then made regarding whether the angle (fourth component of the quaternion) is smaller than 5°. Moreover, to avoid boundary effects, votes are spread across several voxels cells: every time a candidate lands in a voxel, it votes for its neighbors for a score determined by a Gaussian based on its distance to the center. Further, to take into account that translations may land near a boundary between two voxels, each translation also votes for the twenty-six (26) voxels around, using the storing method described above with a voting score following the criterion presented above.

Experimental Results

Data

Figure 7A:
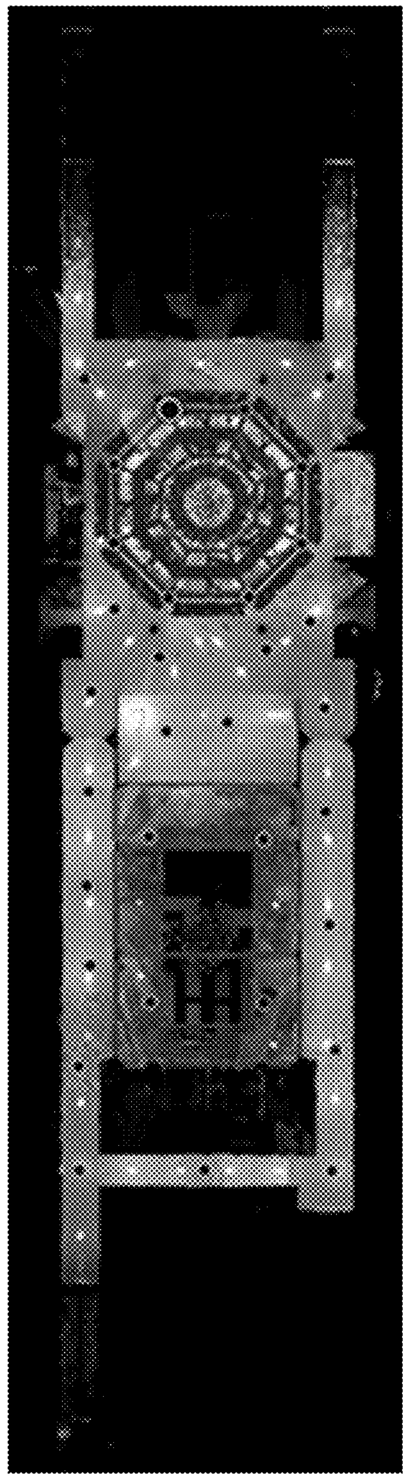
Figure 7B:
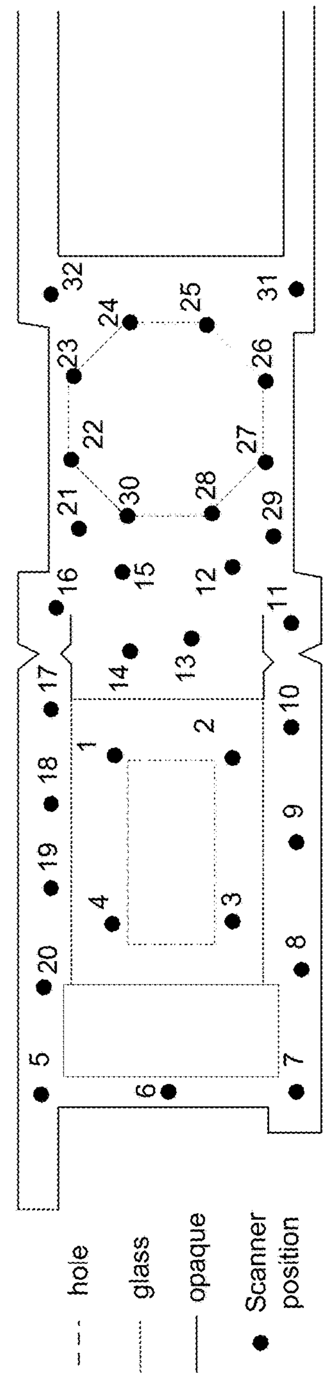
FIG. 7B illustrates a schematic of the dataset of FIG. 7A in accordance with one or more embodiments of the invention.

In an experimental implementation, a dataset was acquired using a FARO FOCUS 3D laser scanner. The acquisition angles ranged from −60° to +90° for elevation, and −180° to +180° for azimuth. The resolution of the associated spherical images was 5142×2134. The dataset was made of 32 scans located in the positions indicated by the top view of the scanner positions illustrated in FIGS. 7A and 7B (black dots numbered 1-31). Accordingly, FIG. 7A illustrates a top down view of the scanner positions on a dataset while FIG. 7B illustrates a schematic of the dataset of FIG. 7A. To estimate the groundtruth positions, a manual registration method was used. Using the AUTODESK RECAP reality capture and 3D scanning application, three correspondences between a pair of scans are selected, and the alignment was estimated and refined. Scans were added one by one, leading to a fully registered dataset. Groundtruth was used to assess the performance.

Results—Repeatability of the Detector

The repeatability of detected keypoints may be systematically estimated using the same process: each keypoint is reprojected in the other scan using groundtruth transform. If it lies in the area of the scan (if there is a 3D point at less than 5 centimeters), one can check if there is a keypoint at less than 15 centimeters. The repeatability is the ratio between the number of points that fill this last criterion and the total number of keypoints that were successfully reprojected.

As a starting point, SIFT keypoints can be detected, tuning the standard parameters: minimum scale, number of octaves, number of scales per octave and response threshold. This last parameter impacts the number of keypoints, thus increasing the repeatability. The repeatability of keypoints as well as the performance of the above-described method can then be evaluated.

Results—Pertinence of the Descriptor/Voting Scheme

Figure 8:
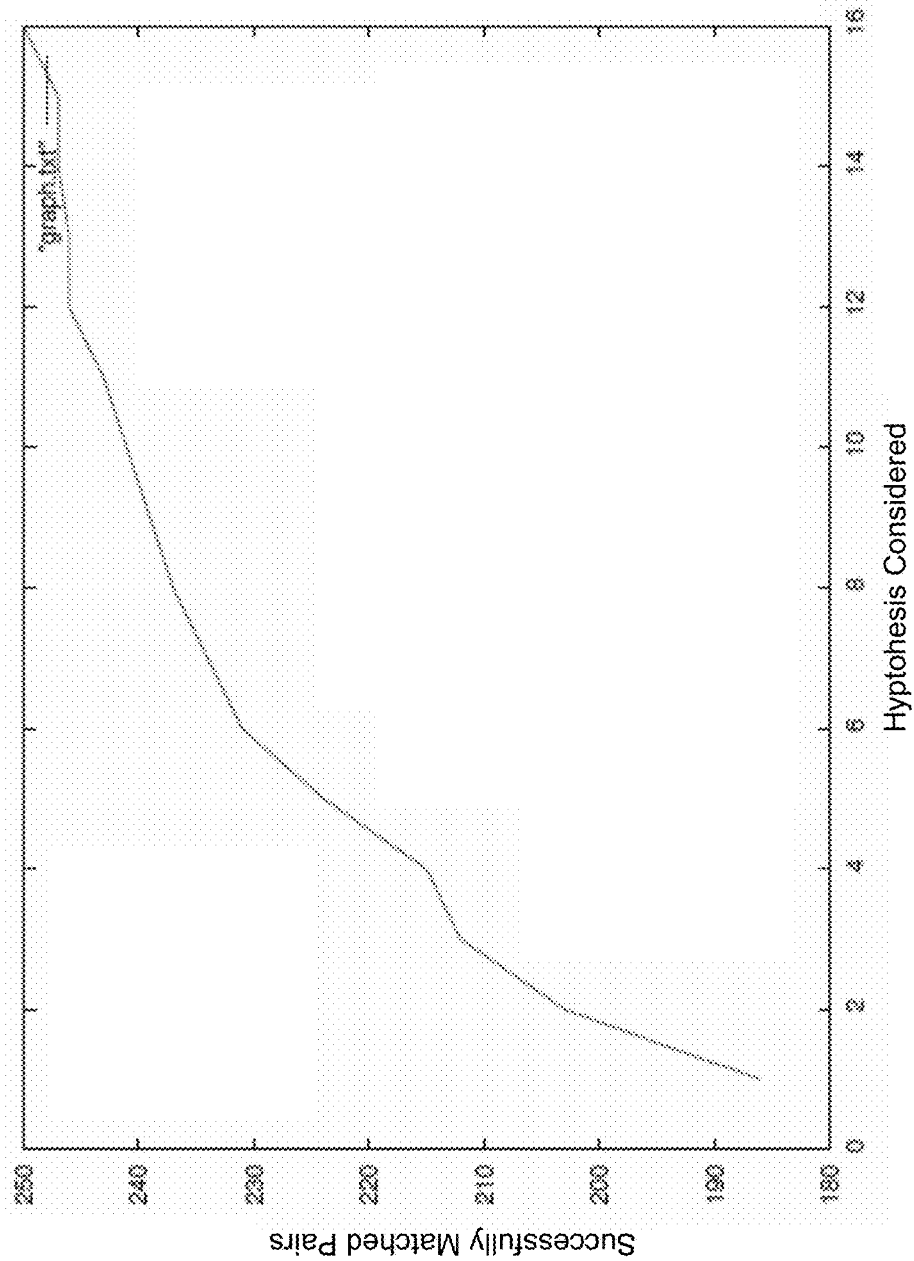
FIG. 8 illustrates a graph of the number of pairs successfully matched depending on the number of top-rated hypotheses in accordance with one or more embodiments of the invention.

The voting scheme provides a set of sorted hypotheses. The hypotheses with the highest score are the ones that appeared the most during the voting process, and are assumed to be the most relevant. One or more embodiments only score the first 16 hypotheses, since considering more does not improve the results significantly. FIG. 8 illustrates a graph of the number of pairs successfully matched depending on the number of top-rated hypotheses in accordance with one or more embodiments of the invention. In this regard, the graph of FIG. 8 represents the number of pairs of scans that successfully matched depending on the number of hypotheses considered.

Results—Computation Time for Data Preprocess and Matching

Embodiments of the invention split the method into two parts:

The first part extracts information—descriptors—from the scans. Thus, the time only depends on the number of scans.

The second part matches those descriptors across scans. The time is highly dependent on the number of keypoints extracted/descriptors built.

Conclusion

This concludes the description of the preferred embodiment of the invention. The following describes some alternative embodiments for accomplishing the present invention. For example, any type of specialized computer, such as a mainframe, minicomputer, or personal computer, or computer configuration, such as a timesharing mainframe, local area network, or standalone personal computer, could be used with the present invention. In summary, facing the needs of a method able to deal with wide baseline and large scale datasets, embodiments of the invention perform a global registration of point cloud scans by relying on strong local matches rather than on a global description of the scene. This approach provides the ability to match scans even with a very low overlap. The detection is still sensitive to occlusions and it strongly impacts the efficiency of the method as a whole. Moreover, only one normal per detected match is considered. Detecting and describing corners may further strengthen the system. A corner could, for instance, be described using the several normals that form it.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

REFERENCES

[1] Y. Diez, F. Roure, X. Llado, J. Salvi, A qualitative review on 3d coarse registration methods, ACM Comput. Surv. 47 (3) (2015) 45:1{45:36.

[2] P. Besl, N. D. McKay, A method for registration of 3-d shapes, Pattern Analysis and Machine Intelligence, IEEE Transactions on 14 (2) (1992) 239-256.

[3] S. Rusinkiewicz, M. Levoy, Efficient variants of the icp algorithm, in: Proceedings of the Third Intl. Conf. on 3D Digital Imaging and Modeling, 2001, pp. 145-152.

[4] A. Makadia, A. I. Patterson, K. Daniilidis, Fully automatic registration of 3d point clouds, in: Proceedings of the 2006 IEEE Computer Society Conference on Computer Vision and Pattern Recognition—Volume 1, 370 CVPR '06, IEEE Computer Society, Washington, D.C., USA, 2006, pp. 1297-1304.

[5] A. Nuchter, K. Lingemann, J. Hertzberg, Cached k-d tree search for icp algorithms, in: 3-D Digital Imaging and Modeling, 2007. 3DIM '07. Sixth International Conference on, 2007, pp. 419-426.

[6] M. Donoser, H. Bischof, 3d segmentation by maximally stable volumes (msvs), in: Proceedings of the 18th International Conference on Pattern Recognition, Volume 1, IEEE Computer Society, 2006, pp. 63-66.

[7] J. Sun, M. Ovsjanikov, L. Guibas, A concise and provably informative multi-scale signature based on heat diffusion, in: Proceedings of the Symposium on Geometry Processing, SGP '09, Eurographics Association, Aire-la-Ville, Switzerland, Switzerland, 2009, pp. 1383-1392.

[8] A. Zaharescu, E. Boyer, K. Varanasi, R. Horaud, Surface feature detection and description with applications to mesh matching, in: Computer Vision and Pattern Recognition, 2009. CVPR 2009. IEEE Conference 385 on, 2009, pp. 373-380.

[9] Y. Zhong, Intrinsic shape signatures: A shape descriptor for 3d object recognition, in: Computer Vision Workshops (ICCV Workshops), 2009 IEEE 12th International Conference on, 2009, pp. 689-696.

[10] A. Mian, M. Bennamoun, R. Owens, On the repeatability and quality 390 of keypoints for local feature-based 3d object retrieval from cluttered scenes, International Journal of Computer Vision 89 (2-3) (2010) 348-361.

[11] I. Sipiran, B. Bustos, Harris 3d: A robust extension of the harris operator for interest point detection on 3d meshes, Vis. Comput. 27 (11) 395 (2011) 963-976.

[12] J. Feldmar, N. Ayache, Rigid, affine and locally affine registration of freeform surfaces, International Journal of Computer Vision 18 (2) (1996) 99-119.

[13] C. Chua, R. Jarvis, Point signatures: A new representation for 3d object recognition, International Journal of Computer Vision 25 (1) (1997) 63-85.

[14] F. Tombari, S. Salti, L. Di Stefano, Unique signatures of histograms for local surface description, in: Proceedings of the 11th European Conference on Computer Vision Conference on Computer Vision: Part III, ECCV '10, Springer-Verlag, Berlin, Heidelberg, 2010, pp. 356-369.

[15] Z. Zhang, S. H. Ong, K. Foong, Improved spin images for 3d surface matching using signed angles, in: Image Processing (ICIP), 2012 $19^{th}$ IEEE International Conference on, 2012, pp. 537-540.

[16] T. Darom, Y. Keller, Scale-invariant features for 3-d mesh models, Image Processing, IEEE Transactions on 21 (5) (2012) 2758-2769.

[17] H. Pottmann, J. Wallner, Q.-X. Huang, Y.-L. Yang, Integral invariants for robust geometry processing, Comput. Aided Geom. Des. 26 (1) (2009) 37-60.

[18] J. V. Wyngaerd, L. V. Gool, Automatic crude patch registration: Toward automatic 3d model building, Comput. Vis. Image Underst. 87 (1-3) (2002) 8-26.

[19] M. Krtgen, M. Novotni, R. Klein, 3d shape matching with 3d shape contexts, in: In The 7th Central European Seminar on Computer Graphics, 425 2003.

[20] T. Dey, J. Giesen, S. Goswami, Shape segmentation and matching with flow discretization, in: F. Dehne, J.-R. Sack, M. Smid (Eds.), Algorithms and Data Structures, Vol. 2748 of Lecture Notes in Computer Science, Springer Berlin Heidelberg, 2003, pp. 25-36.

[21] N. D. Cornea, D. Silver, P. Min, Curve-skeleton properties, applications, and algorithms, IEEE Transactions on Visualization and Computer Graphics 13 (3) (2007) 530-548.

[22] A. Tagliasacchi, H. Zhang, D. Cohen-Or, Curve skeleton extraction from incomplete point cloud, in: ACM SIGGRAPH 2009 Papers, SIGGRAPH '09, ACM, New York, N.Y., USA, 2009, pp. 71:1-71:9.

[23] R. Rusu, N. Blodow, M. Beetz, Fast point feature histograms (fpfh) for 440 3d registration, in: Robotics and Automation, 2009. ICRA '09. IEEE International Conference on, 2009, pp. 3212-3217.

[24] T. Dey, K. Li, C. Luo, P. Ranjan, I. Safa, Y. Wang, Persistent heat signature for pose-oblivious matching of incomplete models, Computer Graphics Forum 29 (5) (2010) 1545-1554.

[25] Y. Guo, F. Sohel, M. Bennamoun, J. Wan, M. Lu, Rops: A local feature descriptor for 3d rigid objects based on rotational projection statistics, in: Communications, Signal Processing, and their Applications (ICCSPA), 2013 1st International Conference on, 2013, pp. 1-6.

[26] J.-P. Tarel, H. Civi, D. B. Cooper, Pose estimation of free-form 3d objects without point matching using algebraic surface models, in: Proceedings of IEEE Workshop Model Based 3D Image Analysis, Mumbai, India, 1998, pp. 13-21

[27] C.-S. Chen, Y.-P. Hung, J.-B. Cheng, Ransac-based darces: a new approach to fast automatic registration of partially overlapping range images, Pattern Analysis and Machine Intelligence, IEEE Transactions on 21 (11) (1999) 1229-1234.

[28] J. Salvi, C. Matabosch, D. Fo, J. Forest, A review of recent range image registration methods with accuracy evaluation, Image Vision Comput. 25 (5) (2007) 578-596.

[29] Y. Diez, J. Mart, J. Salvi, Hierarchical normal space sampling to speed up point cloud coarse matching, Pattern Recognition Letters 33 (16) 465 (2012) 2127-2133.

[30] N. Gelfand, N. J. Mitra, L. J. Guibas, H. Pottmann, Robust global registration, in: Proceedings of the Third Eurographics Symposium on Geometry Processing, no. 197 in SGP '05, Eurographics Association, Aire-la-Ville, Switzerland, Switzerland, 2005.

[31] D. Aiger, N. J. Mitra, D. Cohen-Or, 4pointss congruent sets for robust pairwise surface registration, in: ACM SIGGRAPH 2008 Papers, SIG475 GRAPH '08, ACM, New York, N.Y., USA, 2008, pp. 85:1-85:10.

[32] J. Santamara, O. Cordn, S. Damas, A comparative study of state-of-the-art evolutionary image registration methods for 3d modeling, Computer Vision and Image Understanding 115 (9) (2011) 1340-1354.

[33] B. Zeisl, K. Koser, M. Pollefeys, Automatic registration of RGB-D scans via salient directions, in: IEEE International Conference on Computer Vision, ICCV 2013, Sydney, Australia, Dec. 1-8, 2013, IEEE, 2013, pp. 2808-2815.

[34] N. Mellado, D. Aiger, N. J. Mitra, Super 4pcs fast global pointcloud registration via smart indexing, Computer Graphics Forum 33 (5) (2014) 205-215.

[35] M. Mohamad, D. Rappaport, M. Greenspan, Generalized 4-points congruent sets for 3d registration, in: Proceedings of the 2014 2Nd International Conference on 3D Vision—Volume 01, 3DV '14, IEEE Computer Society, Washington, D.C., USA, 2014, pp. 83-90.

[36] B. Drost, M. Ulrich, N. Navab, S. Ilic, Model globally, match locally: Efficient and robust 3d object recognition, in: Computer Vision and Pattern Recognition (CVPR), 2010 IEEE Conference on, 2010, pp. 998-495 1005.

[37] T. Birdal, S. Ilic, Point pair features based object detection and pose estimation revisited, in: 3D Vision, IEEE, 2015, pp. 527-535.

[38] M. Pauly, M. Gross, L. Kobbelt, Efficient simplification of point-sampled surfaces, in: Visualization, 2002. VIS 2002. IEEE, 2002, pp. 163-170.

[39] H. Badino, D. Huber, Y. Park, and T. Kanade, Fast and Accurate computation of Surface Normals from Range Images, International Conference on Robotics and Automation (ICRA), Shanghai, China, May 9-13, 2011.

What is claimed is:

1. A computer-implemented method for globally registering point cloud scans, comprising:

(a) acquiring a first three-dimensional (3D) point cloud and a second 3D point cloud, wherein:
   (1) the first point cloud and the second point cloud have a subset of points in common;
   (2) there is no prior knowledge on an alignment between the first point cloud and the second point cloud;

(b) detecting particular points, wherein the particular points are those points within the first point cloud that are likely to be identified in the second point cloud, and those points within the second point cloud that are likely to be identified in the first point cloud;

(c) retrieving information about a normal of each of the detected particular points;

(d) building a descriptor on each of the detected particular points, wherein each descriptor describes only 3D information;

(e) determining one or more matching pairs of descriptors, wherein each of the one or more matching pairs comprises a first descriptor from the first point cloud and a second descriptor from the second point cloud;

(f) estimating one or more rigid transformation hypotheses, wherein:
   (1) each rigid transformation hypothesis represents a transformation between the first point cloud and the second point cloud; and
   (2) each rigid transformation hypothesis is based on the 3D information in the one or more matching pairs of the descriptors;

(g) accumulating the one or more rigid transformation hypotheses into a fitted space;

(h) selecting one or more of the one or more rigid transformation hypotheses based on density;

(i) validating the one or more selected rigid transformation hypotheses based on a scoring; and (j) selecting one of the validated selected rigid transformation hypotheses as a registration between the first point cloud and the second point cloud.

2. The computer-implemented method of claim 1, wherein the first point cloud and the second point cloud are acquired from LiDAR (light imaging, detection and ranging) scans.

3. The computer-implemented method of claim 1, wherein the detecting is performed by undertaking, on the first point cloud, successive filters at different scales.

4. The computer-implemented method of claim 1, wherein the detecting further comprises:

filtering those points within the first point cloud based on a threshold of response intensity;

splitting a space of the first point cloud into fixed-size 3D buckets; and considering only a first n strongest points in each of the fixed-size 3D buckets.

5. The computer-implemented method of claim 1, wherein the retrieving comprises:

considering a neighborhood around each of the detected particular points, wherein each neighborhood corresponds to a detected particular point;

attempting to fit a plane around each neighborhood using normalized least squares;

if the attempt is successful;
   based on the plane, calculating a normal for the corresponding detected particular point;
   refining the normal; and discarding a particular points of the detected particular points that do not have the calculated normal.

6. The computer-implemented method of claim 1, wherein the building comprises:

estimating a spatial distance between a first detected particular point and a second detected particular point;

estimating a first angle between a first normal of the first detected particular point and a line defined between the first detected particular point and the second detected particular point;

estimating a second angle between a second normal of the second detected particular point and the line defined between the first detected particular point and the second detected particular point; and estimating a third angle between the first normal and the second normal.

7. The computer-implemented method of claim 1, wherein the determining the one or more matching pairs of the descriptors comprises:

building a 4D kd-tree using all of the descriptors;

for the first descriptor, performing a nearest neighbor search in the 4D kd-tree for candidate descriptors from the second point cloud;

keeping one or more of the candidate descriptors whose distance to the first descriptor is within a threshold value; and storing the one or more of the candidate descriptors that are kept.

8. The computer-implemented method of claim 1, wherein the scoring is based on:

a translation of each selected rigid transformation hypothesis as a first criterion; and a rotation of each selected rigid transformation hypothesis as a second criterion.

9. The computer-implemented method of claim 1, wherein the validating comprises:

reading a first rigid transformation hypothesis of one of the one or more selected rigid transformation hypotheses, wherein the first rigid transformation hypothesis comprises a translation and a rotation;

finding a voxel in 3D voxel space that corresponds to the translation;

if the voxel is empty, then storing the first rigid transformation hypothesis;

if the voxel is not empty, if the rotation is within a threshold rotation to an existing hypothesis group in the voxel, adding the first rigid transformation hypothesis to the existing hypothesis group and storing the first rigid transformation hypothesis in the voxel; and if the rotation is outside of the threshold rotation to the existing hypothesis group, creating a new hypothesis group and adding the first rigid transformation hypothesis to the new hypothesis group and storing the first rigid transformation hypothesis in the voxel;

wherein when the first rigid transformation hypothesis is stored in the voxel, adding a score to neighboring voxels, wherein the score is determined by a Gaussian based on a distance from the first rigid transformation hypothesis to a center of the neighboring voxels.

10. A system for globally registering point cloud scans comprising:

a processor;

a memory storing a set of instructions, wherein the set of instructions, when executed by the processor, cause the processor to perform operations comprising:

(a) acquiring a first three-dimensional (3D) point cloud and a second 3D point cloud, wherein:

(1) the first point cloud and the second point cloud have a subset of points in common;

(2) there is no prior knowledge on an alignment between the first point cloud and the second point cloud;

(b) detecting particular points, wherein the particular points are those points within the first point cloud that are likely to be identified in the second point cloud, and those points within the second point cloud that are likely to be identified in the first point cloud;

(c) retrieving information about a normal of each of the detected particular points;

(d) building a descriptor on each of the detected particular points, wherein each descriptor describes only 3D information;

(e) determining one or more matching pairs of descriptors, wherein each of the one or more matching pairs comprises a first descriptor from the first point cloud and a second descriptor from the second point cloud;

(f) estimating one or more rigid transformation hypotheses, wherein:

(1) each rigid transformation hypothesis represents a transformation between the first point cloud and the second point cloud; and (2) each rigid transformation hypothesis is based on the 3D information in the one or more matching pairs of the descriptors;

(g) accumulating the one or more rigid transformation hypotheses into a fitted space;

(h) selecting one or more of the one or more rigid transformation hypotheses based on density;

(i) validating the one or more selected rigid transformation hypotheses based on a scoring; and (j) selecting one of the validated selected rigid transformation hypotheses as a registration between the first point cloud and the second point cloud.

11. The computer-implemented system of claim 10, wherein the first point cloud and the second point cloud are acquired from LiDAR (light imaging, detection and ranging) scans.

12. The computer-implemented system of claim 10, wherein the detecting is performed by undertaking successive filters, on the first point cloud, at different scales.

13. The computer-implemented system of claim 10, wherein the detecting further comprises:

filtering those points within the first point cloud based on a threshold of response intensity;

splitting a space of the first point cloud into fixed-size 3D buckets; and considering only a first n strongest points in each of the fixed-size 3D buckets.

14. The computer-implemented system of claim 10, wherein the retrieving comprises:

considering a neighborhood around each of the detected particular points, wherein each neighborhood corresponds to a detected particular point;

attempting to fit a plane around each neighborhood using normalized least squares;

if the attempt is successful;

based on the plane, calculates a normal for the corresponding detected particular point;

refines the normal; and discarding a particular points of the detected particular points that do not have the calculated normal.

15. The computer-implemented system of claim 10, wherein the building comprises:

estimating a spatial distance between a first detected particular point and a second detected particular point;

estimating a first angle between a first normal of the first detected particular point and a line defined between the first detected particular point and the second detected particular point;

estimating a second angle between a second normal of the second detected particular point and the line defined between the first detected particular point and the second detected particular point; and estimating a third angle between the first normal and the second normal.

16. The computer-implemented system of claim 10, wherein the determining the one or more matching pairs of the descriptors comprises:

building a 4D kd-tree using all of the descriptors;

for the first descriptor, performing a nearest neighbor search in the 4D kd-tree for candidate descriptors from the second point cloud;

keeping one or more of the candidate descriptors whose distance to the first descriptor is within a threshold value; and storing the one or more of the candidate descriptors that are kept.

17. The computer-implemented system of claim 10, wherein the scoring is based on:

a translation of each selected rigid transformation hypothesis as a first criterion; and a rotation of each selected rigid transformation hypothesis as a second criterion.

18. The computer-implemented system of claim 10, wherein the validating comprises:

reading a first rigid transformation hypothesis of one of the one or more selected rigid transformation hypotheses, wherein the first rigid transformation hypothesis comprises a translation and a rotation;

finding a voxel in 3D voxel space that corresponds to the translation;

if the voxel is empty, then storing the first rigid transformation hypothesis;

if the voxel is not empty, if the rotation is within a threshold rotation to an existing hypothesis group in the voxel, adding the first rigid transformation hypothesis to the existing hypothesis group and storing the first rigid transformation hypothesis in the voxel; and if the rotation is outside of the threshold rotation to the existing hypothesis group, creating a new hypothesis group and adding the first rigid transformation hypothesis to the new hypothesis group and storing the first rigid transformation hypothesis in the voxel;

wherein when the first rigid transformation hypothesis is stored in the voxel, adding a score to neighboring voxels, wherein the score is determined by a Gaussian based on a distance from the first rigid transformation hypothesis to a center of the neighboring voxels.

* * * * *